United States Patent [19]
Finvold et al.

[11] 3,714,430
[45] Jan. 30, 1973

[54] PHOTOELEMENT INTENSE RADIATION PROTECTIVE DEVICE

[75] Inventors: Rodger C. Finvold, Charles M. Davis, both of San Diego, Calif.

[73] Assignee: The United States of America as represented by the Secretary of the Navy

[22] Filed: May 19, 1967

[21] Appl. No.: 642,650

[52] U.S. Cl.............................250/83.3 H, 250/86, 350/1, 350/160 P, 350/316
[51] Int. Cl..............................G02f 1/28, G02b 5/22
[58] Field of Search...350/316, 1, 160 P; 250/83.3 R, 250/86; 307/88.5

[56] References Cited

UNITED STATES PATENTS

| | | | |
|---|---|---|---|
| 3,020,406 | 2/1962 | Whitney | 350/1 X |
| 3,317,848 | 5/1967 | Keyes | 307/88.5 |

OTHER PUBLICATIONS

Sill: "Transmittance Spectra of Color Filters" P1584-1587, Analytical Chemistry Vol. 33, No. 11 Oct. 1961

*Primary Examiner*—Samuel Feinberg
*Assistant Examiner*—R. Kinberg
*Attorney*—G. J. Rubens and J. M. St. Amand

[57] ABSTRACT

An optical detector protective device for a radiation detecting system consisting of a filter of direct-band-gap emitting semiconductor material, which has an extremely steep absorption edge as compared to indirect band gap materials and a spectral filter for passing desired bandwidth. The absorption edge of the direct-band-gap filter being adjacent its emitting line and positioned such as to pass the desired emission line at ordinary temperatures and attenuate the emission line at elevated temperatures. The device prevents deterioration of the detector in the presence of high intensity light sources in cases where monochromatic or near monochromatic light is employed. The absorption coefficient of the device varies greatly with temperature and wave length.

3 Claims, 3 Drawing Figures

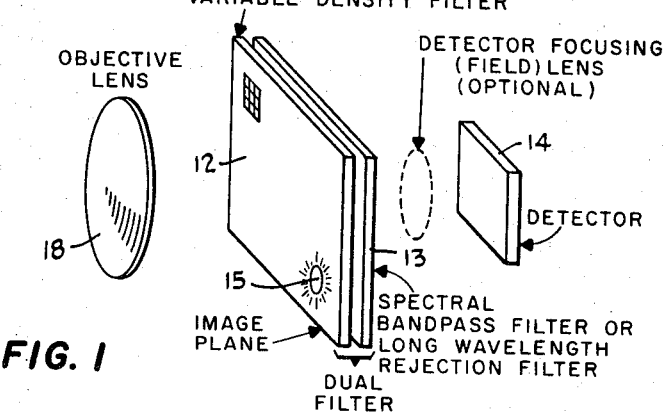
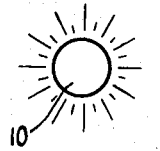
HIGH INTENSITY OPTICAL INTERFERENCE
TARGET
FIG. 3
FIG. 1
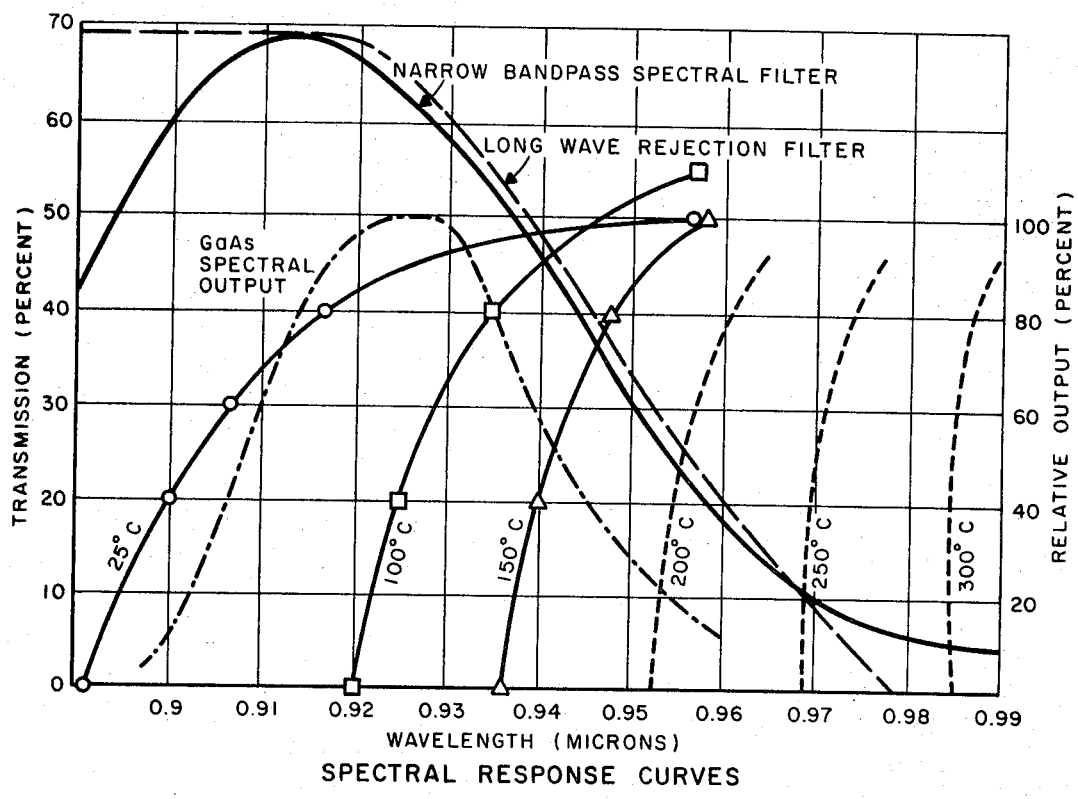
SPECTRAL RESPONSE CURVES
FIG. 2
RODGER C. FINVOLD
CHARLES M. DAVIS
*INVENTORS*
BY
*ATTORNEY*

PHOTOELEMENT INTENSE RADIATION PROTECTIVE DEVICE

This invention relates to improvements in optical or near optical detector systems and can be used to overcome the problems of bright objects, such as high intensity light.

The purpose of this invention is to provide an optical electromagnetic energy transmission device whose attenuation characteristics are a function of the intensity of incident radiant optical and near optical electromagnetic energy for use in protecting photodetective elements from high intensity radiant sources, such as solar radiation, without materially attenuating the desired signal from a target.

While ordinary interference filters shift their pass band with temperature, the shift is limited and usually insufficient for many purposes, and furthermore they require that light be incident normal to the surface, necessitating collimation and, hence, destroying any spatial discrimination between sun and target, for instance.

In the past, filter devices using materials such as Jena glass, colloidal suspensions, indirect band gap materials, and a variety of phototropic materials and the like have been used to modify light intensity. However, these devices all have some drawbacks in that they are either not capable of changing the attenuation factor, are incapable of fast response or the degree of attenuation desired or require collimation in order that light be incident normal to their surface. The filter disclosed in U.S. Pat. No. 3,020,406 by T. R. Whitney for Energy Detection Apparatus approaches more closely to the protective device of the instant invention than any of the prior art; however, the system of Whitney does not employ either a direct band gap material filter nor a spectral filter and cannot operate in the same manner as the instant invention to provide an absorption coefficient that varies greatly with temperature and wavelength.

The dual filter protective device of this invention consists essentially of a spectral filter of desired bandwidth together with a thin slice of semiconductor direct-band-gap material that has a very steep absorbing edge which is adjacent to its inherent emitting line and passes a desired emission line at ordinary temperatures and attenuates the emission line at elevated temperatures. The dual filter has fast response, reversibility, and does not require light collimation.

FIG. 1 is a diagrammatic view of an optical detecting system showing use of a dual filter of the present invention.

FIG. 2 shows typical Spectral Response Curves for GaAs and a spectral filter.

FIG. 3 is a diagrametic view of another embodiment of the invention.

The present invention which attenuates high intensity light such as sunlight without attenuating the desired signal involves non-linear response or attenuation that varies as a function of intensity. For example: Where the sun 10, FIG. 1, occupies an angular aperture of $10^{-4}$ steradian and a target 11 $10^{-2}$ steradian, even if the total power levels were the same, the sun would have an intensity 100 times greater than the target. However, if one is concerned with a received signal intensity of approximately $10^{-9}$ watt in $10^{-2}$ steradian and a solar constant of 100 mw/cm$^2$ into an aperture two inches in diameter (approx. 20 cm$^2$) filtered to 300 A bandwidth with a spectral filter resulting in a net effective solar radiation intensity (after spectral filtering) of approximately 2 mw/cm$^2$ or 4.0 mw total effective input power in an angular aperture of $10^{-4}$ rad., it is readily apparent that there is approximately a ratio of $10^7$ in intensity difference.

The use of Gallium arsenide in a filter of the present device is based on absorption rather than scattering, which is not dependent upon collimation or subsequent focusing and employs the absorption edge of gallium arsenide, or as modified by doping and temperature.

The dual filter shown in FIG. 1 of drawing consists of a variable density filter 12, such as a thin film of gallium arsenide, in conjunction with a spectral filter 13. The variable density filter is in the image plane and the spectral filter is placed before the variable density filter (VDF), as shown in FIG. 3, when protecting the VDF against very high radiation, or in the preferred position as shown in FIG. 1 the spectral filter is between the variable density filter and the detector 14. This dual filter operates to effectively "eclipse" direct sunlight if an image 15 of the sun 10 is focused thereon via an objective lens 18. Spectral response curves for a sample of gallium arsenide are shown in FIG. 2. Gallium arsenide provides a time constant on the order of a few milliseconds. Thermal conduction of the gallium arsenide causes spreading of the attenuation area outside the focused image of the sun and thus provides attenuation to sunlight as new areas are illuminated by a moving image of the high intensity source of light.

Attenuation Spreading Data On 0.007 inch GaAs VDF

| position (mms) | readings (volts) | | Remarks |
|---|---|---|---|
| +4 | 0.07 (edge) | 1. | Maximum transmission through GaAs VDF = 0.158 volts |
| +3 | 0.15 | | |
| +2 | 0.107 | 2. | 8.5 amps on 300 watt Xenon arc lamp — Flickering of the arc produced bothersome meter fluctuations at lower currents. |
| +1 | 0.06 | | |
| 0 | 0.0055 | | |
| −1 | 0.063 | | |
| −2 | 0.12 | 3. | Neutral density filter with 31.6% transmission placed in front of arc. |
| −3 | 0.13 | | |
| −4 | 0.135 | | |
| −5 | (edge) | | |

However, experimental data, as shown in the above table, indicates the thermal spreading to be quite nominal when the illuminated spot is on the order of 1 mm diameter. The "Position" in the above table is the distance in millimeters from an illuminated spot on the order of 1 millimeter diameter at which a "Reading" is made; the "Reading" being taken at the photodetector of light transmission through the filter at the various "Positions." As an example, in a system using a signal source for operation at 9000 A (~1.35 ev) a spectral filter of 300 A bandwidth and a corresponding detector, the field of view is focused on the variable density filter (i.e., a thin sheet of GaAs, GaAs alloy, or other material having optical transmission properties similar to that described herein for GaAs). At 1.4 ev radiation, the absorption coefficient, $\alpha$, for the GaAs varies from 2 at 77° K to approximately 100 at 300° K. The additional attenuation expressed in db is the ratio of the absorption coefficients. If the cold attenuation is adjusted to 1 db, the hot attenuation would be 50 db or only 0.00001 incident power would emerge from the film.

Enormous changes in absorption coefficient, $\alpha$, can be achieved with small changes in temperature at certain bias points. For example, with radiation having a photon energy of 1.4 ev, $\alpha$ changes from 2.5 to over 100 in going from 77° K. to 300° K. It is instructive to determine the thickness which would result in one db of attenuation at 77° K. and then to determine the increase in $\alpha$ and the incremental temperature necessary to accomplish, for example, a desired 20 db reduction. The ratio of input power, $P_i$, to output power, $P_o$, for 1 db loss is:

$$P_i/P_o = \text{antilog}_{10}\, 0.1 = 1.25$$

The attenuation of light in an absorptive medium is $$P_o = P_i e^{-\alpha t}$$

Where $\alpha$ is the absorption constant and $t$ is the thickness of material $$e^{\alpha t} = 1.25$$

$$\ln 1.25 = \alpha t = 0.223$$

$$t = (.233/2.5) \sim 0.1 \text{ cm}$$

Next, the attenuation coefficient for a 40 db reduction in photon arrival rate will be obtained. (Assuming a Poisson distribution in background photons, a 20 db noise reduction implies a 40 db reduction in photon rate.)

$$(P_o/P_i) = 10^{-4} = e^{-.1\alpha}$$

$$e^{.1\alpha} = 10^4$$

$$\ln 10^4 = 0.1\alpha = 9.2$$

$$\alpha = 92$$

This value for $\alpha$ would require a temperature on the order of 270° K or a $\Delta$ T of approximately 200° K.

These numbers are merely used to illustrate the operation of the system.

Numbers based upon a thinner film having a thickness of $10^{-3}$ cm ($10\mu$), for example, will be useful in showing practicability of the invention.

$$\alpha_1 t = \ln 1.25 = 0.223$$

$$\alpha_1 = (.223/10^{-3}) = 223$$

$$\alpha_2 t = 9.2$$

$$\alpha_2 = 9200$$

It is noted that the ratio of $\alpha_2$ to $\alpha_1$ is approximately 40 for both cases, which is the ratio of the db of additional attenuation postulated; an obvious result since both the bulk attenuation and power attenuation expressed in db are logarithmic functions.

The gallium arsenide thin film is easily heated to a high temperature in a localized area with minimum tendency to spread to distances much greater than the dimensions of the spot and, thus, has a relatively short time constant.

Situations where ambient temperature changes could cause a severe shift in attenuation can be minimized quite easily by mounting the device in an oven controlled to some nominal temperature much as crystal oscillators are similarly protected.

The determination of temperature differential, spreading, and the time constant characteristics is described, for example, for a filter with a thickness of $10\mu$. The following system and material properties will be assumed:

| Solar constant | 100 mw/sq. cm |
| Receiver aperture | 10 sq. cm |

Thermal conductivity, $k = (w/\Delta T)(l/A)$ 0.37 watt cm$^{-1}$°C$^{-1}$

The time required to achieve a change in temperature on the order of 100 degrees C will be calculated.

$$H = sm\Delta T = s\rho V \Delta T$$

Where:
$T =$ Temperature in degrees C
$H =$ Heat in calories
$s =$ Specific heat in calories/gram
$\rho =$ Specific gravity or density in grams/cm$^3$
$V =$ Volume in cm$^3$ For GaAs, $\rho$ has a value of 5.3 and the average atomic heat is 5.7 at 273° C from which $s$ is determined to be 0.074.

An image field size of 100 mm$^2$ will be assumed for the 120° conical or $\pi$ steradian field of view. 16 mm motion picture image size for comparison, is actually only 75 mm$^2$. Thus, the $10^{-4}$ steradian of the sun would occupy less than $10^{-2}$ mm$^2$. The volume of material exposed to the radiation of the sun would thus be approximately $10^{-7}$ cm$^3$.

$$H = 7.4 \times 10^{-2} \times 5.7 \times 10^{-7} \times 10^2$$

$$= 4.2 \times 10^{-6} \text{ cal.}$$

$$\sim 10^{-5} \text{ joule}$$

Assuming that a spectral filter removes 90 percent of the incident energy, the energy incident on the focal spot of the sun would be 0.1 watt. Assuming only 10 percent of the energy incident on the filter is absorbed (on the previous assumption of 1–40 db, the absorption would be 20 to 99.99 percent), this results in $10^{-2}$ joule per second. Thus, the time required to change the temperature 100° C is on the order of 4 milliseconds assuming no heat losses due to convection or reradiation or other mechanisms.

The thermal loss H by thermal conductivity is approximated by assuming a 0.1 mm thermal path, 0.1 mm diameter of the image of the sun on the filter and $10\mu$ thickness of the nonlinear absorbing film.

$$H = (kA\Delta T/l)$$

Where H is the rate of heat transfer in watts, $k$ is thermal conductivity in watts °C$^{-1}$ l$^{-1}$, A is the area of the thermal path in cm² and $l$ is the length of the thermal path from source to sink in cm.

$$= (0.37 \times 2\pi \times 10^{-2} \times 10^{-3} \times 10^{2/10-1})$$

$$\sim 0.02 \text{ watt}$$

or approximately 200 percent of the input heat is conducted radially with a temperature of 100° C. The assumptions on which the sample calculations are based are conservative with regard to this result in that the image area of the sun would be one-third of that assumed, the absorption would be 2–10 times that assumed and the thermal resistance would be somewhat more than assumed. This loss results from the extremely high conductivity — comparable to many metals. It is interesting to note that an alloy of 50 percent intrinsic GaAs with 50 intrinsic InAs has a conductivity only 10 percent of pure GaAs. Doped GaAs has a different conductivity. One favorable aspect of the high thermal conductivity is that this makes it relatively easy to prevent thermal damage.

The thermal resistance may be explicitly stated, as found in many textbooks (e.g., E. Hausman and E. P. Slack, "Physics," O. Van Nostrand) by summing the rings in the following manner:

$$R_{thermal} = \frac{1}{K} \sum_{r=1}^{r=n} \frac{r_2 - r_1}{h \cdot 2\pi \frac{(r_2+r_1)}{2}}$$

$$= \frac{1}{l\pi hK} \int_{r_1}^{r_{max}} \frac{dr}{r}$$

$$R_{thermal} = \frac{1}{2\pi hK} \ln \frac{r_{max}}{r_1}$$

Obviously many modifications and variations of the present invention are possible in the light of the above teachings. It is therefore to be understood that within the scope of the appended claims the invention may be practiced otherwise than as specifically described.

What is claimed is:

1. In an optical and near optical radiation detecting system including a photodetecting element and optical means for focusing the field of view onto an image plane located in front of the photodetecting element, the improvement being a photoelement protective device comprising:

a. an optical electromagnetic transmission variable density filter consisting of a thin sheet of material selected from gallium arsenide and an alloy of 50 percent gallium arsenide with 50 percent intrinsic indium arsenide whose attenuation characteristics are a function of the intensity of incident radiant optical and near optical electromagnetic energy, said variable density filter positioned in the image plane of the field of view and covers all the image plane that includes the objective field of view, said variable density filter having an electromagnetic radiation absorption coefficient that varies markedly with temperature from substantially 1 db at cold attenuation to 50 db at hot attenuation when the filter is heated by high intensity electromagnetic energy focused thereon from the field of view, b. a spectral filter of desired bandwidth positioned adjacent said variable density filter, said variable density and spectral filters protecting the photodetecting element from being damaged by high intensity electromagnetic radiation encountered in the field of view, c. said variable density filter consisting of a direct-band-gap emitting-semiconductor material having an extremely steep absorption edge which is adjacent to its emitting line and which is positioned to pass a desired emission line at ordinary temperature and attenuate the emission line at elevated temperatures, said variable density filter having fast response and high degree of attenuation.

2. A device as in claim 1 wherein said spectral filter is positioned between said variable density filter and the photodetecting element.

3. A device as in claim 1 wherein said variable density filter is positioned between said spectral filter and the photodetecting element to protect the variable density filter from damage due to extremely high radiation intensity.

* * * * *